(12) United States Patent
Lee

(10) Patent No.: US 10,207,582 B2
(45) Date of Patent: Feb. 19, 2019

(54) DIFFERENTIAL ASSEMBLY WITH CLUTCH

(71) Applicant: SCHAEFFLER TECHNOLOGIES AG & CO. KG, Herzogenaurach (DE)

(72) Inventor: Brian Lee, York, SC (US)

(73) Assignee: Shaeffler Technologies AG & Co. KG, Herzogenaurach (DE)

(*) Notice: Subject to any disclaimer, the term of this patent is extended or adjusted under 35 U.S.C. 154(b) by 75 days.

(21) Appl. No.: 15/639,060

(22) Filed: Jun. 30, 2017

(65) Prior Publication Data

US 2019/0001816 A1  Jan. 3, 2019

(51) Int. Cl.
| B60K 17/34 | (2006.01) |
| B60K 17/346 | (2006.01) |
| B60K 23/08 | (2006.01) |
| B60K 17/16 | (2006.01) |
| F16H 48/08 | (2006.01) |
| F16H 57/037 | (2012.01) |

(52) U.S. Cl.
CPC .......... B60K 17/3462 (2013.01); B60K 17/18 (2013.01); B60K 23/0808 (2013.01); F16H 48/08 (2013.01); F16H 57/037 (2013.01)

(58) Field of Classification Search
None
See application file for complete search history.

(56) References Cited

U.S. PATENT DOCUMENTS

| 6,296,097 | B1  |  10/2001 | Hunt et al. |
| 6,520,885 | B2  |   2/2003 | Gassmann et al. |
| 7,905,312 | B2* |   3/2011 | Kato ................. B60K 23/0808 180/245 |
| 8,127,908 | B2* |   3/2012 | Williams ............. F16D 41/088 192/35 |
| 8,825,324 | B2* |   9/2014 | Horaguchi ........... B60K 17/344 701/53 |
| 9,688,141 | B2* |   6/2017 | Takaishi ................ F16D 13/74 |
| 9,701,196 | B2* |   7/2017 | Mita ...................... B60K 23/08 |
| 9,863,517 | B2* |   1/2018 | Sheen .................... F16H 48/06 |
| 9,981,552 | B2* |   5/2018 | Ogawa .................. B60K 23/08 |
| 9,989,151 | B2* |   6/2018 | Imafuku ............... B60K 17/08 |
| 10,000,118 | B2* |   6/2018 | Ogawa ................ B60K 17/344 |
| 2010/0094519 | A1* |  4/2010 | Quehenberger ....... B60K 17/35 701/69 |
| 2016/0096429 | A1* |  4/2016 | Imafuku ............. B60K 17/344 180/233 |

* cited by examiner

*Primary Examiner* — Dirk Wright
(74) *Attorney, Agent, or Firm* — Brooks Kushman P.C.

(57) ABSTRACT

A differential assembly includes a side gear configured to receive torque and a wedge clutch. The wedge clutch includes a hub configured to connect with a shaft and a wedge element radially disposed between the hub and the side gear. The wedge element has an inner surface seated on the hub and an outer surface engageable with the side gear. The wedge element is radially expandable and has a rested state in which the side gear and the hub are rotatable relative to each other and an expanded state in which the side gear and hub are rotationally locked to each other.

20 Claims, 4 Drawing Sheets

DIFFERENTIAL ASSEMBLY WITH CLUTCH

TECHNICAL FIELD

The present disclosure relates to differential assemblies that can be disconnected from driven wheels of a vehicle, and more specifically to differential assemblies having a clutch configured to disconnect a differential side gear from a half shaft.

BACKGROUND

Motor vehicles typically include a differential on the drive axle to transmit torque produced by an engine to driven wheels of the vehicle. The differential allows the driven wheels to rotate at different speeds relative to each other. This allows the outer wheel to rotate faster than the inner wheel when the vehicle is turning.

A typical differential includes a ring gear meshing with a pinion gear that is fixed to a driveshaft. A differential carrier is fixed to the ring gear and is supported for rotation within a housing of the differential. The carrier supports a pair of side gears and a pair of spider gears in meshing engagement with the side gears. The side gears are driveably connected to the driven wheels. The spider gears transmit torque from the carrier to the side gears to propel the vehicle.

Limited-slip differentials are also known. A common type utilizes clutch packs to create a power-flow path directly from the carrier to one of the side gears when one of the driven wheels is slipping. These types of differentials are useful in situations where one of the driven wheels has high traction and the other has low traction. These types of differentials are not capable of disconnecting the carrier from the driven wheels, which is advantageous in some situations.

This disclosure provides solutions to these and other problems.

SUMMARY

According to one embodiment, a differential assembly includes a carrier supporting a pair of opposing first and second side gears and a pair of opposing spider gears meshing between the first and second sides gears. The first side gear includes an inner surface defining a plurality of circular grooves. A wedge clutch is disposed in the carrier and includes a hub defining an inner surface configured to receive a shaft and an outer surface. A wedge element is radially disposed between the hub and the first side gear. The wedge element has an inner surface seated on the hub and an outer surface defining a plurality of raised rings received in the grooves. The wedge element is configured to radially expand to lock the hub with the first side gear when the clutch is engaged.

According to another embodiment, a differential assembly includes a side gear configured to receive torque and a wedge clutch. The wedge clutch includes a hub configured to connect with a shaft and a wedge element radially disposed between the hub and the side gear. The wedge element has an inner surface seated on the hub and an outer surface engageable with the side gear. The wedge element is radially expandable and has a rested state in which the side gear and the hub are rotatable relative to each other and an expanded state in which the side gear and hub are rotationally locked to each other.

According to yet another embodiment, a differential assembly includes a carrier configured to receive torque, a side gear supported by the carrier, and a wedge clutch. The wedge clutch includes an axially movable hub configured to connect with a shaft and having a tapered portion defining a first cammed profile. A wedge element is radially disposed between the hub and the side gear and has an inner surface seated on the tapered portion. The wedge element defines a second cammed profile that cooperates with the first cammed profile to radially expand the wedge element in response to relative rotation between the hub and the wedge element. The wedge clutch includes an engaged state in which the wedge element is expanded to lock the side gear and the hub due to cooperation of the first and second cammed profiles and a disengaged state in which the wedge element is in a rested position to allow relative rotation between the side gear and the hub. The wedge clutch is switched between the engage and disengaged states by axially moving hub towards and away from the wedge element.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
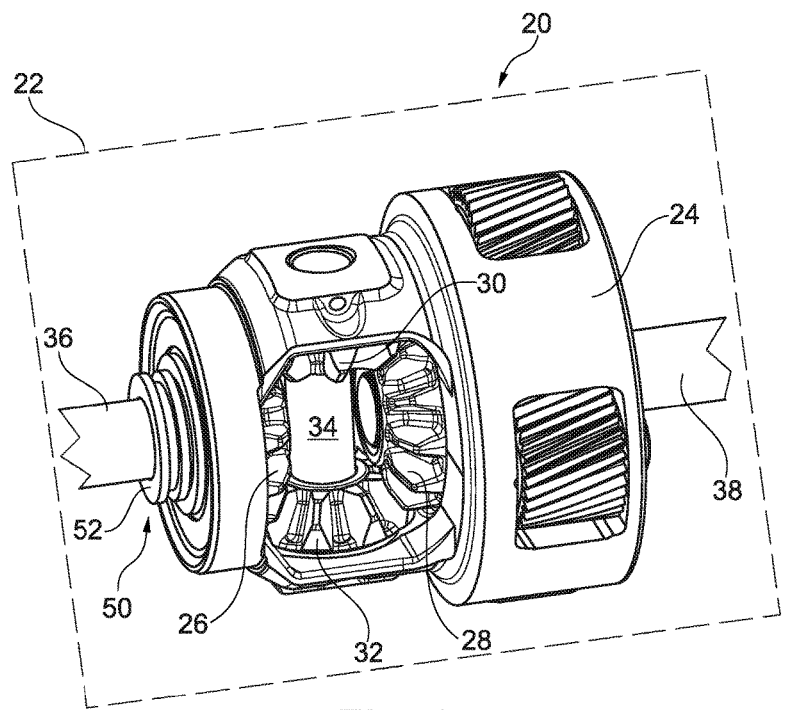
FIG. 1 is a partial perspective view of a differential assembly.
Figure 2:
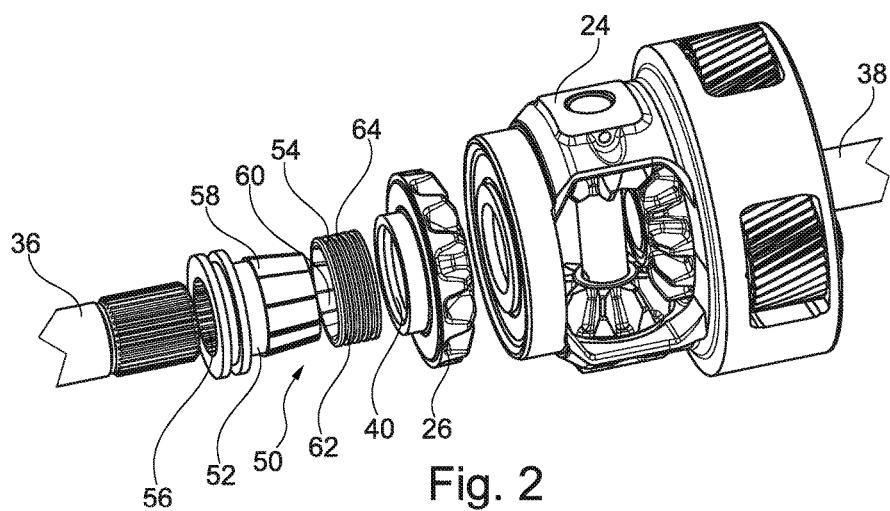
FIG. 2 is an exploded view of the differential assembly of FIG. 1.

Referring to FIGS. 1 and 2, a differential assembly 20 may be used to transmit an input torque generated by a powerplant, e.g. an engine or electric motor, to a pair of driven wheels. The differential assembly 20 may be used as part of a front-axle assembly, as part of a rear-axle assembly, or both. The differential assembly 20 includes a housing 22 and a carrier 24 disposed within the housing. The carrier 24 is supported for rotation within the housing 22 and is configured to receive power from the powerplant via a powertrain. The carrier 24 may support a pair of opposing first and second side gears 26, 28 and a pair of opposing first and second spider gears 30, 32 that are in meshing engagement with the side gears. A pin 34 may interconnect the spider gears 30, 32. The first side gear 26 is configured to transmit torque to a left half shaft 36, and the second side gear 28 is configured to transmit torque to the right half shaft 38.

Half shafts are traditionally splined directly to the side gears. In this arrangement, the carrier of the differential is fixed to the driven wheels of the vehicle and rotates whenever the vehicle is moving. This may not be problematic for rear-wheel-drive or front-wheel-drive vehicles, but, for all-wheel-drive or four-wheel-drive vehicles, it may be advantageous to disconnect the differential from the road when that differential is not transmitting torque to the driven wheels.

The differential assembly 20 includes a wedge clutch 50 operable to disconnect the carrier 24 from the driven wheels. In the illustrated embodiment, this is done by disconnecting the side gear 26 from the left half shaft 36 via the wedge clutch 50. Alternatively, the wedge clutch 50 could disconnect the second side gear 28 from the right half shaft 38. The wedge clutch 50 includes a hub 52 having an inner surface 56 connected to the left half shaft 36 with a spline or other suitable connection that allows the hub 52 to move axially relative to the side gear 26. The hub 52 may include a conical portion 58 received within a hole defined by an inner surface 40 of the side gear 26. A wedge element 54 is radially disposed between the conical portion 58 and the inner surface 40. The wedge element 54 may define a cylindrical body 64 having an inner surface 60 seated on the conical portion 58 and an outer surface 62 facing the inner surface 40 of the gear 26. The wedge element 54 is formed of a resilient material, such as steel, that allows the wedge element 54 to radially expand and contract. The hub 52, the wedge element 54, and the side gear 26 may be concentric with each other and supported for rotation about a common axis.

Figure 3:
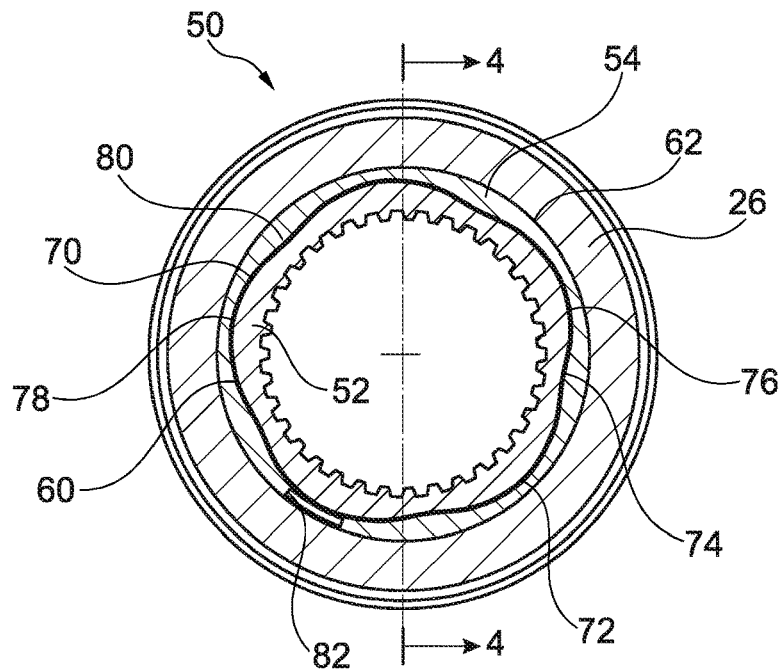
FIG. 3 is a cross-sectional view of a wedge clutch for use with the differential assembly.
Figure 4:
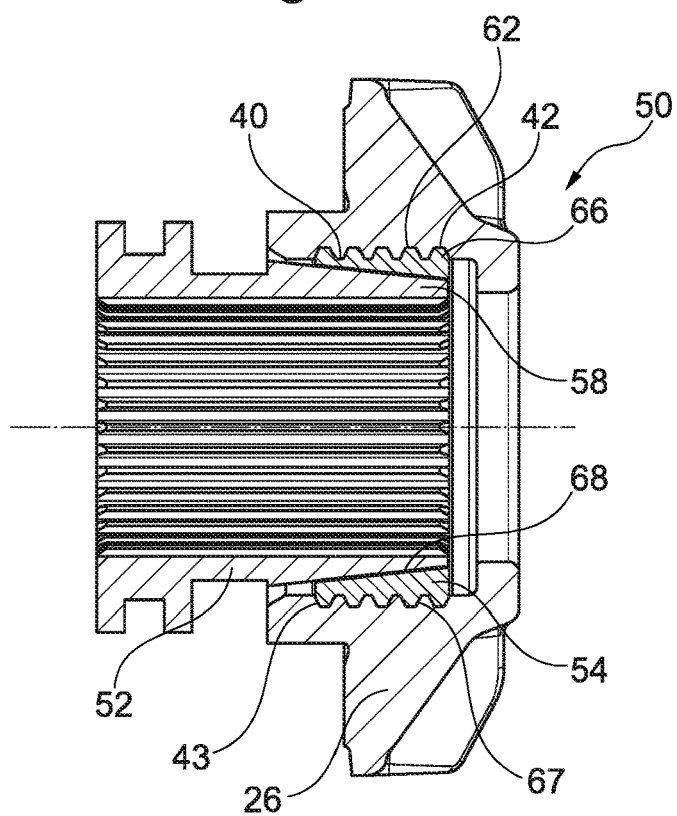
FIG. 4 is a cross-sectional view of the wedge clutch along cutline 4-4.

Referring to FIGS. 3 and 4, the wedge clutch 50 operates by radially expanding the wedge element 54 to lock the hub 52 to the side gear 26 when the wedge clutch 50 is engaged and by allowing the wedge element 54 to radially contract to permit independent rotation between the hub 52 and the side gear 26 when the clutch is disengaged. The inner surface 40 of the gear 26 may define a plurality of grooves 42 and the outer surface 62 of the wedge element 54 may define a plurality of raised rings 66 that are received in the grooves 42. The raised rings 66 are configured to frictionally engage with the grooves 42 to fix the side gear 26 to the wedge element 54 when the wedge clutch 50 is engaged. In one embodiment, each groove 42 defines a pair of slanted surfaces 43 that engage with slanted surfaces 67 of a corresponding raised ring 66.

The conical portion 58 of the hub 52 defines a tapered surface 68 that is not perfectly circular and instead includes a cammed profile 70 having ramps 72 that extend radially outward from the center of the hub and valleys 74 disposed between the ramps 72. The inner surface 60 of the wedge element 54 also has a cammed profile 76 having lobes 78 and peaks 80.

The cammed profiles 70 and 76 have substantially matching shapes so that the ramps 72 are received in the lobes 78 when the hub 52 and the wedge element 54 are in a first rotational position relative to each other. In the first rotational position, which corresponds to a disengaged state of the clutch, the wedge element 54 is not expanded. When the wedge element 54 and the hub 52 rotate relative to each other, the cammed profiles 70 and 76 become misaligned, i.e., the ramps 72 slide onto the peaks 80, causing the wedge element 54 to radially expand from a resting position to an expanded position. Radial expansion of the wedge element 54 causes the raised rings 66 to frictionally engage with the grooves 42 of the side gear 26. The cammed profiles 70, 76 cooperate to lock the wedge element 54 to the hub 52. The wedge element 54 may include a slit 82 extending axially through the wedge element 54. The slit 82 facilitates the radial expansion of the wedge element 54.

Figure 5B:
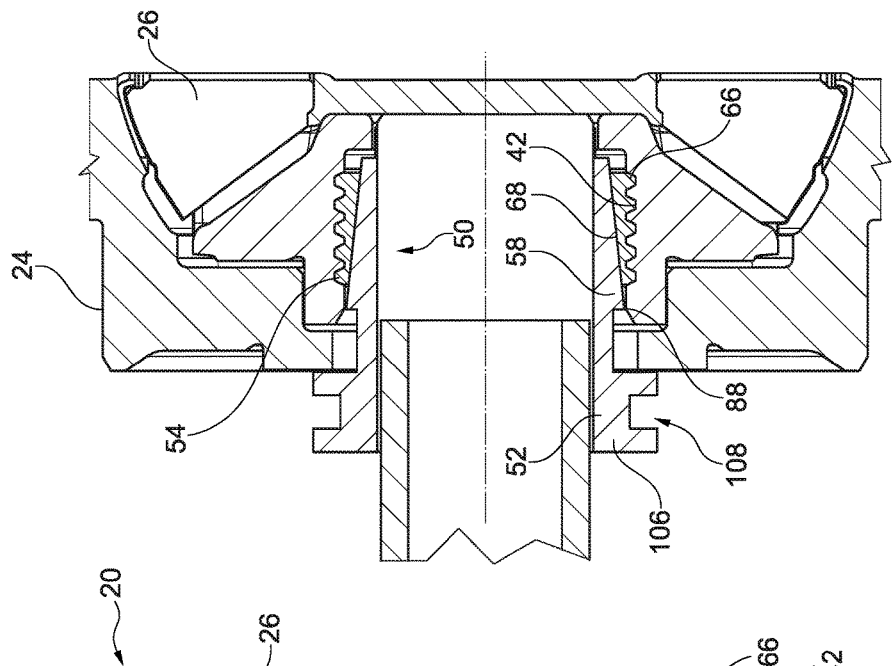
FIG. 5B is a cross-sectional view of the differential assembly showing the wedge clutch in an engaged state.
Figure 5A:
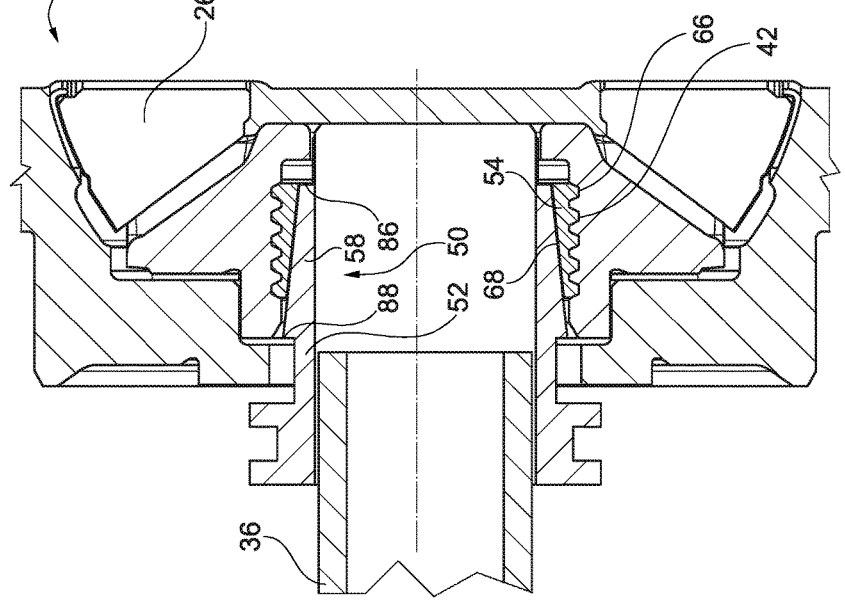
FIG. 5A is a cross-sectional view of the differential assembly showing the wedge clutch in a disengaged state.

FIG. 5A illustrates the wedge clutch 50 in the disengaged state with the wedge element 54 axially positioned near a first end 86 of the conical portion 58. The first end 86 has a diameter that is smaller than a resting inner diameter of the wedge element 54 allowing the raised rings 66 to be loosely disposed in the grooves 42 when the hub 52 is in the retracted position.

Referring to FIG. 5B, locking of the wedge clutch 50 is initiated by sliding the hub 52 towards the side gear 26, via actuator (not shown), causing the wedge element 54 to slide on the tapered surface 68. The increasing diameter of the tapered surface 68 slightly expands the wedge element 54 as it moves towards the second end 88 of the conical portion 58 creating friction between the raised rings 66 and the grooves 42. The friction force between the side gear 26 and the wedge element 54 decelerates the wedge element 54 causing relative rotation between the wedge element 54 and the hub 52. When the wedge element 54 and the hub 52 rotate relative to each other, the cammed profiles 70, 76 become misaligned to further radially expand the wedge element 54 substantially increasing the frictional engagement between the raised rings 66 and the grooves 42 causing the clutch 50 to lock. The wedge clutch 50 is considered locked when the rotational speed difference between the hub 52 and the side gear 26 approximates zero.

Figure 6:
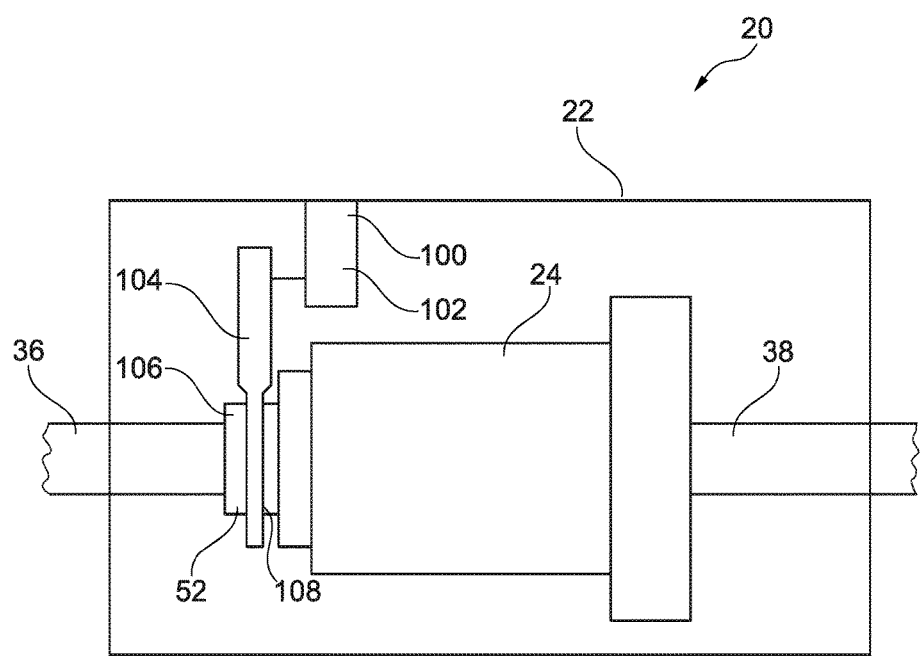
FIG. 6 is a schematic diagram of the differential assembly and illustrates an example actuator arrangement that operates the wedge clutch.

Referring to FIGS. 5B and 6, the hub 52 may be slid by an actuator arrangement 100, which may be hydraulic, pneumatic, magnetic, mechanical, or a combination thereof. In one embodiment, the actuator arrangement 100 includes a hydraulic cylinder 102 mounted to the differential housing 22. The hydraulic cylinder 102 is coupled to the hub 52 by a fork 104. The hub 52 may include an end portion 106 that is opposite the conical portion 58 and defines a groove 108 configured to receive a distal end of the fork 104. Activation of the hydraulic cylinder 102 actuates the fork 104 to slid the hub 52 towards or away from the side gear 26 to engage or disengage the wedge clutch 50. Many other types of actuator arrangements may be used to actuate the hub 52 and this disclosure is not limited to any particular actuator arrangement.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A differential assembly comprising:
   a carrier supporting a pair of opposing first and second side gears and a pair of opposing spider gears meshing between the first and second sides gears, wherein the first side gear includes an inner surface defining a plurality of circular grooves; and
   a wedge clutch disposed in the carrier and including:
      a hub defining an inner surface configured to receive a shaft and an outer surface, and
      a wedge element radially disposed between the hub and the first side gear and having an inner surface seated on the hub and an outer surface defining a plurality of raised rings received in the grooves, wherein the wedge element is configured to radially expand to lock the hub with the first side gear when the clutch is engaged.

2. The differential assembly of claim 1, wherein the outer surface of the hub is tapered.

3. The differential assembly of claim 1, wherein the hub is axially movable relative to the wedge element and the wedge clutch is engaged in response to the hub being moved towards the wedge element and is disengaged in response to the hub being moved away from the wedge element.

4. The differential assembly of claim 1, wherein the outer surface of the hub defines a first cammed profile, and the inner surface of the wedge element defines a second cammed profile configured to cooperate with the first cammed profile to radially expand the wedge element in response to relative rotation between the hub and the wedge element.

5. The differential assembly of claim 1 further comprising an actuator configured to move the hub towards and away from the wedge element.

6. The differential assembly of claim 1, wherein the hub has an outer-end portion defining a circular groove and a tapered portion that defines the outer surface.

7. The differential assembly of claim 6 further comprising:
   a fork received in the circular groove of the outer-end portion; and
   an actuator connected to the fork and operable to move the fork to slide the hub towards or away from the wedge element.

8. A differential assembly comprising:
   a side gear configured to receive torque; and
   a wedge clutch including:
      a hub configured to connect with a shaft, and
      a wedge element radially disposed between the hub and the side gear and having an inner surface seated on the hub and an outer surface engageable with the side gear, wherein the wedge element is radially expandable and includes a rested state in which the side gear and the hub are rotatable relative to each other and an expanded state in which the side gear and hub are rotationally locked to each other.

9. The differential assembly of claim 8, wherein the hub defines radially extending ramps, and the inner surface of the wedge element defines lobes configured to nest with the ramps and peaks located between the lobes, wherein the ramps and the peaks cooperate to radially expand the wedge element to the expanded state in response to relative rotation between the hub and the wedge element.

10. The differential assembly of claim 9, wherein the hub has a tapered portion that defines the radially extending ramps.

11. The differential assembly of claim 10, wherein the hub is axially movable relative to the wedge element and the wedge clutch is engaged in response to the hub being axially moved toward the wedge element and is disengaged in response to the hub being moved away from the wedge element.

12. The differential assembly of claim 11, further comprising an actuator configured to axially move the hub.

13. The differential assembly of claim 8, wherein the side gear defines a circular groove and the wedge element defines a raised ring disposed in the groove.

14. The differential assembly of claim 13, wherein the circular groove has a first pair of slanted surfaces, and the raised ring has a second pair of slanted surfaces each configured to frictionally engage with one of the first pair of slanted surfaces to lock the side gear and the wedge element when the wedge element is in the expanded state.

15. The differential assembly of claim 14, wherein the side gear defines a plurality of circular grooves and the wedge element defines a plurality of raised rings each disposed in one of the grooves.

16. The differential assembly of claim 8, wherein the wedge element is substantially cylindrical in shape and defines a slit extending axially through the wedge element.

17. A differential assembly comprising:
   a carrier configured to receive torque;
   a side gear supported by the carrier; and
   a wedge clutch including:
      an axially movable hub configured to connect with a shaft and having a tapered portion defining a first cammed profile, and
      a wedge element radially disposed between the hub and the side gear and having an inner surface seated on the tapered portion and defining a second cammed profile that cooperates with the first cammed profile to radially expand wedge element in response to relative rotation between the hub and the wedge element, and further having an outer surface engageable with the side gear; wherein
      the wedge clutch includes an engaged state in which the wedge element is expanded to lock the side gear and the hub due to cooperation of the first and second cammed profiles and a disengaged state in which the wedge element is in a rested position to allow relative rotation between the side gear and the hub, and
      the wedge clutch is switched between the engage and disengaged states by axially moving hub towards and away from the wedge element.

18. The differential assembly of claim 17, wherein the side gear includes an inner surface defining a plurality of axially spaced circular grooves, and the wedge element defines a plurality of axially spaced raised rings each disposed in one of the grooves.

19. The differential assembly of claim 17 further comprising an actuator configured to axially move the hub towards and away from the wedge element to engage and disengage the wedge clutch.

20. The differential assembly of claim 17, wherein the wedge element is substantially cylindrical in shape and defines a slit extending axially through the wedge element.

\* \* \* \* \*